United States Patent [19]
Lucky, Sr.

[11] Patent Number: 5,642,673
[45] Date of Patent: Jul. 1, 1997

[54] SNOW AND ICE MELTING DEVICE

[76] Inventor: Bobby D. Lucky, Sr., 103 Winchester Rd. NE., Huntsville, Ala. 35810

[21] Appl. No.: 629,104

[22] Filed: Apr. 8, 1996

[51] Int. Cl.⁶ ................................................. B61F 19/00
[52] U.S. Cl. ............................................ 104/279; 105/72.2
[58] Field of Search ............................ 104/279; 105/72.2, 105/215.2, 238.1, 355; 280/160; 244/114 Q

[56] References Cited

U.S. PATENT DOCUMENTS

| | | | |
|---|---|---|---|
| 34,257 | 1/1862 | Luckett | 104/279 |
| 343,353 | 6/1886 | Wright | 104/279 |
| 506,501 | 10/1893 | Healy et al. | 104/279 |
| 3,019,742 | 2/1962 | Kershaw | 105/72.2 |
| 3,041,748 | 7/1962 | Wetzel | 104/279 |
| 3,866,539 | 2/1975 | Gasser | 104/279 |
| 3,872,855 | 3/1975 | Kawata | 126/271.2 |
| 3,951,065 | 4/1976 | Macnab | 102/22 |
| 4,354,320 | 10/1982 | Schmidt | 37/213 |
| 4,695,017 | 9/1987 | Ringer et al. | 246/428 |
| 5,018,453 | 5/1991 | Kinard | 105/72.2 |
| 5,389,766 | 2/1995 | Takahashi et al. | 219/635 |

*Primary Examiner*—S. Joseph Morano
*Attorney, Agent, or Firm*—Frank M. Caprio

[57] ABSTRACT

The present invention relates to a snow and ice melting device (10) comprising a road transport vehicle (12) and a railroad track transport vehicle (14) mounted on a common road transport vehicle chassis (12I). Upon the railroad track transport vehicle (14), a melter (16) is mounted on a melter rotator (16C) functioning to rotate the melter from a rearward (road transport vehicle (12) frontward) direction which is utilized as a propulsion device to a frontward (road transport vehicle (12) rearward) direction which is utilized for melting snow and/or ice. The melter (16) has a melter lift (16E) such that a user can angle the melter (16) to a desired position.

25 Claims, 7 Drawing Sheets

SNOW AND ICE MELTING DEVICE

BACKGROUND OF THE INVENTION

1. Field of the Invention

The present invention relates to snow and ice melting device. More particularly, the present invention relates to snow and ice melting device which is mounted on a vehicle having road wheels for road transportation and track wheels for railroad track transportation.

2. Description of the Prior Art

Snow and ice melting devices described in the prior art consist mainly of two categories of apparatuses which are stationary for use on rail road turnouts, tracks and switches as well as railroad track traveling devices which simply plow the snow from the railroad track. Both of the above categories are limited in use and lack the versatility to rapidly drive via roads to a inclement weather troubled location and then transport the snow melting device via railroad track to the desired location for snow and ice melting. When the job is complete, the railroad mounted snow and ice melting device can travel to a crossroad location and convert to a road transportation vehicle to rapidly travel to a new location via roads.

Numerous innovations for snow and ice melting devices have been provided in the prior art that are described as follows. Even though these innovations may be suitable for the specific individual purposes to which they address, they differ from the present invention as hereinafter contrasted.

In U.S. Pat. No. 3,872,855, titled Snow Melting Device for Railroad Turnout, invented by Kawata, comprises of a boiler located near a railroad turnout or switch and the steam from the said boiler is heated by the exhaust gas of the burners of the said boiler to be mixed together with the exhaust gas. The mixture is then sent to the points of the turnout or switch to be utilized in melting the snow piled at and around the turnout.

The above described patented invention differs from the present invention because it utilizes a stationary mounted boiler system, utilizing steam as a melting means, positioned adjacent to a railroad turnout or switch. The present invention has a road transport vehicle and a railroad track transport vehicle mounted on a common road transport vehicle chassis. Rotatably attached upon the railroad track transport vehicle is a melter with a nozzle attached thereto.

In U.S. Pat. No. 3,951,065, titled Explosive Device and Method for Removing Ice from Railroad Tunnels, invented by Macnab, comprises an explosive device for use in removing ice formed in railroad tunnels and similar underground cavities comprising a base member and mating cap member assembled to form a rigid blast directing assembly having a groove formed around its periphery at the juncture between the base and cap members and a ring shaped explosive substance detonable by an electric charge seated therein. The peripheral groove is of sufficient depth and width that any explosive gases and heat produced therein will be directed radially outward from all sides of the assembly in a relatively thin fan like pattern. In use, a plurality of the devices are fastened in clusters to the interior wall and ceiling surfaces of a railroad tunnel or other underground cavity at those points where water seeping into the cavity is likely to freeze into ice. Whenever the ice accumulates to a thickness protruding beyond a predetermined distance from the interior surface of the cavity the explosive substance seated in the groove around one or more selected assemblies may be detonated by the application of a remotely generated electric charge to shear away the protruding ice. As the ice reforms, the explosive substance within different assemblies may be detonated, thereby keeping the cavity relatively ice free over extended periods of time.

The above described patented invention differs from the present invention because it utilizes a stationary mounted ice breaking device which differs substantially from the present invention having a road transport vehicle and a railroad track transport vehicle mounted on a common road transport vehicle chassis.

In U.S. Pat. No. 4,354,320, titled Snow Plow for Railed Vehicle, invented by Schmidt, comprises a snow removal apparatus for attachment to a rail vehicle in which a rotary snow plow having a pair of coaxial milling cylinders is mounted in a common housing and synchronously driven through a common drive transmission. The housing is mounted to the front end of the vehicle by a first supporting member extending along the width of the vehicle and securely fixed thereto and a second supporting member on which the rotary housing is pivotally held. the second supporting member is adapted to slidably engage with and be held on the first supporting member so that it may be laterally shifted in the horizontal plane, on the fixed supporting member from side to side of the vehicle.

The above described patented invention differs from the present invention because it is a snow blowing device removably mountable to a railroad track transportation vehicle. The present invention has a road transport vehicle and a railroad track transport vehicle mounted on a common road transport vehicle chassis. Rotatably attached upon the railroad track transport vehicle is a melter with a nozzle attached thereto. The present invention is a stand alone device and not an removably mountable accessory as described in the above referenced patent.

In U.S. Pat. No. 4,695,017, titled Railroad Switch Snow Deflecting Air Nozzle Apparatus, invented by Ringer et at., comprises a railroad switch, snow deflecting apparatus is described in which air is fed through conduits to primary nozzles for directing air along the rails and towards the switch points to a position adjacent the apex of the switch. Secondary nozzles are spaced from the primary nozzles and behind the switch points so as to direct air along and between movable rails of the railway switch and in the same direction as air from the primary nozzles to maintain the railway switch operationally free of snow.

The above described patented invention differs from the present invention because it utilizes a stationary mounted pneumatic system positioned adjacent to a railroad turnout or switch utilized to blow snow and ice away. The present invention differs substantially from the above referenced patented invention. The present invention has a road transport vehicle and a railroad track transport vehicle mounted on a common road transport vehicle chassis.

In U.S. Pat. No. 5,389,766, titled Rail Snow Melting by Electromagnetic Induction Heating, invented by Takahashi et at., comprises a snow melting apparatus of an electromagnetic induction heating type, comprises: a high frequency power source, a pair of conductive cables wound in at least one turn around a segment of each rail and throughholes which are formed through side walls of the rail, the segment of the rail being defined between two throughholes, and a lead wire interconnecting the power source and the conductive cable, for supplying current from the power source to the conductive cable, thereby heating the rail by the flow of electromagnetically induced current in the rail segment.

The above described patented invention differs from the present invention because it utilizes a stationary electromagnetic system integrally linked to a railroad track, railroad turnout or switch utilized to melt snow and ice by heating. The present invention differs substantially from the above referenced patented invention. The present invention has a road transport vehicle and a railroad track transport vehicle mounted on a common road transport vehicle chassis.

Numerous innovations for snow and ice melting devices have been provided in the prior art that are adapted to be used. Even though these innovations may be suitable for the specific individual purposes to which they address, they would not be suitable for the purposes of the present invention as heretofore described.

SUMMARY OF THE INVENTION

The present invention relates to snow and ice melting device. More particularly, the present invention relates to snow and ice melting device which is mounted on a vehicle having road wheels for road transportation and railroad track wheels for railroad track transportation. The road transport vehicle and the railroad track transport vehicle are mounted on a common road transport vehicle chassis. Upon the railroad track transport vehicle, a melter having a nozzle with a nozzle diffuser, is rotatably mounted. The melter is preferably a jet engine having its exhaust focused via the nozzle diffuser to melt an area having snow and/or ice thereon. The melter has a hydraulic tilting mechanism to move it to a desired angle.

The types of problems encountered in the prior art are stationary mounted snow and ice melting are limited in scope and require too many to be utilized to accomplish a common goal of a totally obstruction free railroad track system. The numerous stationary mounted devices require too much maintenance and are too costly. The present railroad mounted vehicles are too slow to transport to a desired track location via the railroad track system and require large areas of track to be incapacitated during use.

In the prior art, unsuccessful attempts to solve this problem were attempted namely: stationary mounted and railroad transportable snow and/or ice removing devices. However, the problem was solved by the present invention because it is a combination of both a road transport vehicle and a railroad track transport vehicle each mounted on a common road transport vehicle chassis. The present invention can be rapidly transported via roadways to a problematic area in a railroad track and then rapidly and easily converted from a road transport vehicle to a railroad track transport vehicle which can travel the short distance along the railroad track to the problematic area. The snow and ice melting device can then be rapidly removed from the railroad track and rapidly travel to the next desired location.

Innovations within the prior art are rapidly being exploited in the field of railroad track snow and ice removal devices.

The present invention went contrary to the teaching of the art which teaches stationary mounted and removably mounted accessory devices.

The present invention solved a long felt need for a snow and ice removal device which can be rapidly transported to a desired location of railroad track and then rapidly be removed therefrom.

Accordingly, it is an object of the present invention to provide a snow and ice melting device.

More particularly, it is an object of the present invention to provide a snow and ice melting device having a road transport vehicle and a railroad track transport vehicle mounted on a common road transport vehicle chassis.

In keeping with these objects, and with others which will become apparent hereinafter, one feature of the present invention resides, briefly stated, in the road transport vehicle has a road transport vehicle power means.

When the road transport vehicle is designed in accordance with the present invention, it has the road transport vehicle power means mechanically coupled to a road transport vehicle transmission which is mechanically coupled to a road transport vehicle drive shaft which is mechanically coupled to a road transport vehicle axial gear box.

In accordance with another feature of the present invention, the road transport vehicle has a road transport vehicle railroad track converter.

Another feature of the present invention is that the road transport vehicle has a road transport vehicle hydraulic power means.

Yet another feature of the present invention is that the road transport vehicle has a has a road transport vehicle housing mounted on a road transport vehicle chassis.

Still another feature of the present invention is that the railroad track transport vehicle has a railroad track transport vehicle hydraulic means.

Yet still another feature of the present invention is that the railroad track transport vehicle has a railroad track transport vehicle hydraulic means up-down converter.

Still yet another feature of the present invention is that the railroad track transport vehicle has a railroad track transport vehicle hydraulic means forward-reverse converter.

Another feature of the present invention is that the railroad track transport vehicle has a railroad track transport vehicle hydraulic means clockwise-counter clockwise converter.

Yet another feature of the present invention is that the railroad track transport vehicle has railroad track transport vehicle front wheels rotatably mounted on railroad track transport vehicle front wheel axles which are rotatably mounted on railroad track transport vehicle front wheel stanchions.

Still another feature of the present invention is that the railroad track transport vehicle front wheel stanchion comprises a railroad track transport vehicle front wheel outer stanchion securely mounted to a railroad track transport vehicle front wheel inner stanchion by a railroad track transport vehicle front wheel inner-outer stanchion connecting plate.

Yet still another feature of the present invention is that the railroad track transport vehicle front wheel stanchions are each pivotally mounted on the road transport vehicle chassis by railroad track transport vehicle front wheel stanchion pivot means.

Still yet another feature of the present invention is that the railroad track transport vehicle front wheels are rotated by railroad track transport vehicle front wheel power means.

Another feature of the present invention is that the railroad track transport vehicle front wheel stanchions are each hydraulically raised and lowered by a railroad track transport vehicle front wheel hydraulic piston connected to the road transport vehicle chassis at one distal end and connected to a railroad track transport vehicle front wheel hydraulic piston plate securely fastened to the railroad track transport vehicle front wheel stanchion at the other distal end.

Yet another feature of the present invention is that railroad track transport vehicle has railroad track transport vehicle rear wheels rotatably mounted on a railroad track transport vehicle rear wheel axle which is rotatably mounted on a railroad track transport vehicle rear wheel stanchion.

Still another feature of the present invention is that the railroad track transport vehicle rear wheel stanchion comprises a railroad track transport vehicle rear wheel outer stanchion securely connected to a railroad track transport vehicle rear wheel inner stanchion by a railroad track transport vehicle rear wheel inner-outer stanchion connecting plate.

Yet still another feature of the present invention is securely mounted within the railroad track transport vehicle rear wheel stanchion is a railroad track transport vehicle rear wheel housing.

Still yet another feature of the present invention is that the railroad track transport vehicle rear wheel housing comprises a railroad track transport vehicle rear wheel outer housing securely connected to a railroad track transport vehicle rear wheel inner housing by a railroad track transport vehicle rear wheel outer-inner housing connecting plate.

Another feature of the present invention is that the railroad track transport vehicle rear wheel outer-inner housing connecting plate has a railroad track transport vehicle left rear wheel outer-inner housing connecting plate bracket securely mounted thereon.

Yet another feature of the present invention is that the railroad track transport vehicle rear wheels are rotated by a railroad track transport vehicle rear wheel power means.

Still another feature of the present invention is that the railroad track transport vehicle rear wheel stanchion is raised and lowered by a railroad track transport vehicle rear wheel hydraulic piston which is connected at a top distal end to the road transport vehicle chassis and connected at a bottom distal end to a railroad track transport vehicle rear wheel hydraulic piston plate which is securely mounted on the railroad track transport vehicle rear wheel stanchion.

Yet still another feature of the present invention is that the on the railroad track transport vehicle rear wheel stanchion is pivotally mounted on a railroad track transport vehicle rear wheel stanchion connector lower pivot means which is pivotally mounted on a railroad track transport vehicle rear wheel stanchion connector upper pivot means which is securely fastened to the road transport vehicle chassis.

Still yet another feature of the present invention is that a melter is rotatably and tiltably mounted on the railroad track transport vehicle.

Another feature of the present invention is that the melter is encased within a melter housing.

Yet another feature of the present invention is that the melter housing has a melter housing shroud attached thereto by at least one melter housing shroud fastener.

Still another feature of the present invention is that the melter housing has at least one melter housing shroud handle attached thereon.

Yet still another feature of the present invention is that the melter housing has a melter housing shroud port therein.

Still yet another feature of the present invention is that the melter has a melter heat generating means with a melter heat generating means air intake. The melter heat generating means is preferably a jet engine which runs on diesel fuel.

Accordingly, it is a general object of the present invention to provide the melter mounted on a melter rotator which is mounted on the road vehicle chassis.

It is a more particular objet of the present invention to provide a melter operator housing having melter controlling means therein such that a user can operate the melter and concurrently be protected therefrom.

An object of the present invention is to provide the melter operator housing having at least one melter operator housing window.

A further object of the present invention is to provide the melter operator housing having a melter operator housing safety rail.

A still further object of the invention is to provide a raising and lowering means, a melter lift, for the melter to be placed at a desired angle.

Still yet another feature of the present invention is that the melter has a nozzle securely attached thereto.

Another feature of the present invention is that the attachment means comprises a nozzle front connecting bracket securely affixed to the nozzle and a nozzle rear connecting bracket securely affixed to the melter housing. The nozzle front connecting bracket is securely connected to the nozzle rear connecting bracket by a plurality of nozzle connecting bracket fins.

Yet another feature of the present invention is that the melter has a nozzle diffuser attached thereto which functions to focus the exhaust of the melter heat generating means.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWING

10—snow and ice melting device (10)
12—road transport vehicle (12)
12A—road transport vehicle power means (12A)
12E—road transport vehicle railroad track converter (12E)
12F—road transport vehicle hydraulic power means (12F)
12G—road transport vehicle fuel (12G)
12LF—road transport vehicle left front road wheel (12LF)
12RF—road transport vehicle right front road wheel (12RF)
12LR—road transport vehicle left rear road wheel (12LR)
12RR—road transport vehicle right rear road wheel (12RR)
12H—road transport vehicle housing (12H)
12I—road transport vehicle chassis (12I)
14—railroad track transport vehicle (14)
14A—railroad track transport vehicle hydraulic means (14A)
14AA—railroad track transport vehicle hydraulic means up-down converter (14AA)
14AB—railroad track transport vehicle hydraulic means forward-reverse converter (14AB)
14AC—railroad track transport vehicle hydraulic means clockwise-counter clockwise converter (14AC)
14LF—railroad track transport vehicle left front wheel (14LF)
14LFA—railroad track transport vehicle left from wheel stanchion (14LFA)
14LFAA—railroad track transport vehicle left front wheel outer stanchion (14LFAA)
14LFAC—railroad track transport vehicle left front wheel inner-outer stanchion connecting plate (14LFAC)
14LFAD—railroad track transport vehicle left front wheel stanchion pivot means (14LFAD)
14LFB—railroad track transport vehicle left front wheel power means (14LFB) (not shown)

14LFC—railroad track transport vehicle left front wheel hydraulic piston (14LFC)

14LFD—railroad track transport vehicle left front wheel axle (14LFD)

14RF—railroad track transport vehicle right from wheel (14RF)

14RFA—railroad track transport vehicle right front wheel stanchion (14RFA)

14RFAA—railroad track transport vehicle right front wheel outer stanchion (14RFAA)

14RFAD—railroad track transport vehicle right from wheel stanchion pivot means (14RFAD)

14RFB—railroad track transport vehicle right front wheel power means (14RFB)

14RFC—railroad track transport vehicle right from wheel hydraulic piston (14RFC)

14RFCA—railroad track transport vehicle right front wheel hydraulic piston plate (not shown)

14RFD—railroad track transport vehicle right front wheel axle (14RFD)

14LR—railroad track transport vehicle left rear wheel (14LR)

14LRA—railroad track transport vehicle left rear wheel stanchion (14LRA)

14LRAA—railroad track transport vehicle left rear wheel outer stanchion (14LRAA)

14LRAC—railroad track transport vehicle left rear wheel inner-outer stanchion connecting plate (14LRAC)

14LRBA—railroad track transport vehicle left rear wheel outer housing (14LRBA)

14LRBB—railroad track transport vehicle left rear wheel inner housing (14LRBB)

14LRBCA—railroad track transport vehicle left rear wheel outer-inner housing connecting plate bracket (14LRBCA)

14LRB—railroad track transport vehicle left rear wheel power means (14LRB) (not shown)

14LRC—railroad track transport vehicle left rear wheel hydraulic piston

14LRCA—railroad track transport vehicle left rear wheel hydraulic piston plate (14LRCA)

14LRDA—railroad track transport vehicle left rear wheel stanchion connector upper pivot means (14LRDA)

14LRDB—railroad track transport vehicle left rear wheel stanchion connector lower pivot means (14LRDB)

14LRE—railroad track transport vehicle left rear wheel axle (14LRE)

14RR—railroad track transport vehicle right rear wheel (14RR)

14RRA—railroad track transport vehicle right rear wheel stanchion (14RRA)

14RRAA—railroad track transport vehicle right rear wheel outer stanchion (14PRAA)

14RRAB—railroad track transport vehicle right rear wheel inner stanchion (14RRAB)

14RRB—railroad track transport vehicle right rear wheel power means (14RRB)

14RRC—railroad track transport vehicle right rear wheel hydraulic piston (14RRC)

14RRCA—railroad track transport vehicle right rear wheel hydraulic piston plate (14RRCA)

14RRDA—railroad track transport vehicle right rear wheel stanchion connector upper pivot means (14RRDA)

14RRDB—railroad track transport vehicle right rear wheel stanchion connector lower pivot means (14RRDB)

14RRE—railroad track transport vehicle left rear wheel axle (14LRE)

14RRB—railroad track transport vehicle right rear wheel housing (14RRB)

14RRBB—railroad track transport vehicle right rear wheel inner housing (14RRBB)

14RRBC—railroad track transport vehicle right rear wheel outer-inner housing connecting plate (14RRBC)

14RRBCA—railroad track transport vehicle right rear wheel outer-inner housing connecting plate bracket (14RRBCA)

16—melter (16)

16A—melter housing (16A)

16AA—melter housing shroud (16AA)

16AAA—melter housing shroud handle (16AAA)

16AAB—melter housing shroud fastener (16AAB)

16AAC—melter housing shroud port (16AAC)

16B—melter heat generating means (16B)

16BA—rocker heat generating means air intake (16BA)

16C—melter rotator (16C)

16D—melter operator housing (16D)

16DA—melter operator housing window (16DA)

16DB—melter operator housing safety rail (16DB)

16E—melter lift (16E)

18—nozzle (IS)

18A—nozzle diffuser (18A)

18BA—nozzle front connecting bracket (18BA)

18BB—nozzle rear connecting bracket (18BB)

18BC—nozzle connecting bracket fin (18BC)

20—railroad track (20)

DESCRIPTION OF THE PREFERRED EMBODIMENT

Figure 1:
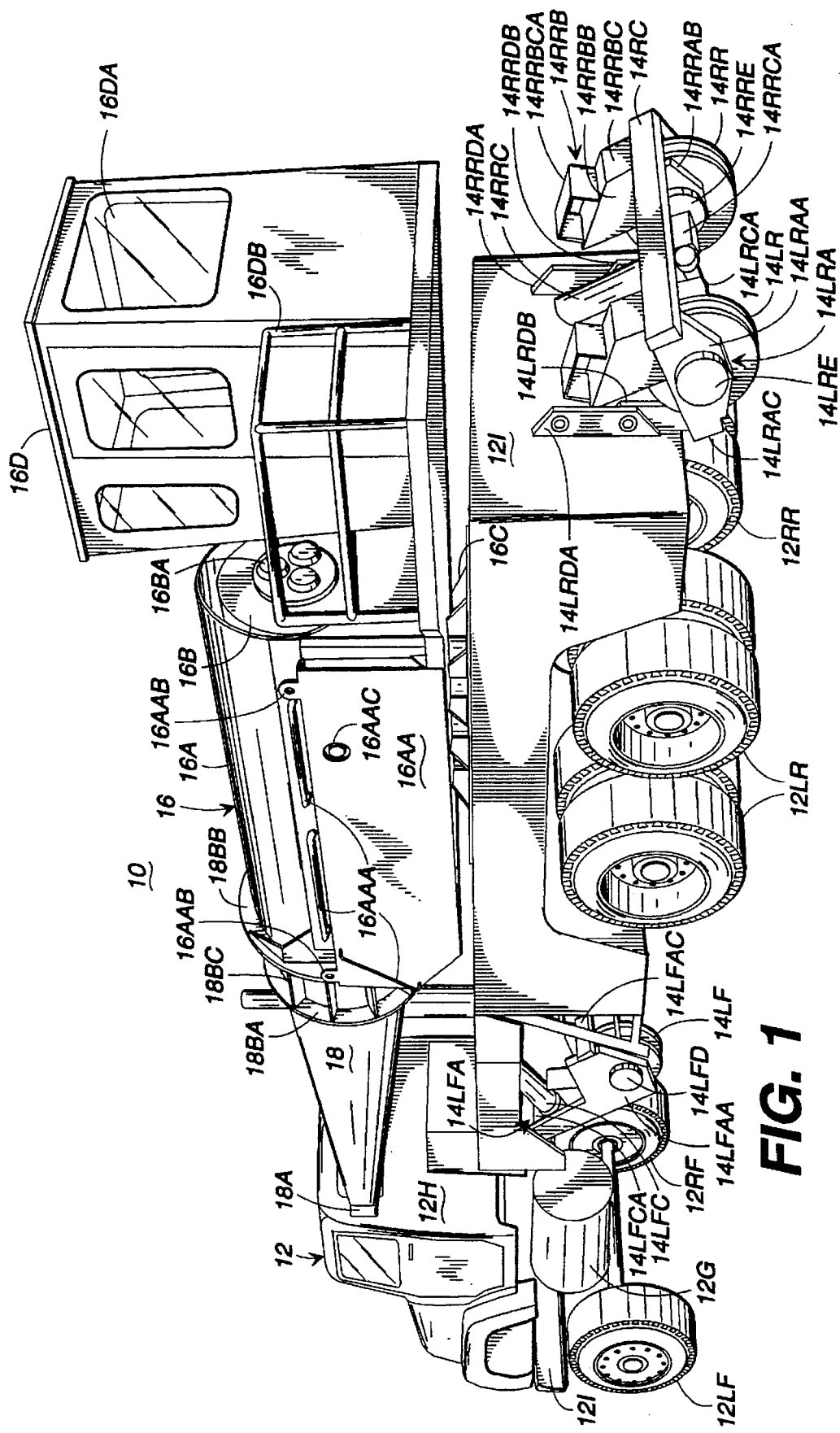
FIG. 1 is a left-rear perspective view of a snow and ice melting device (10) in a road transporting configuration.
Figure 2:
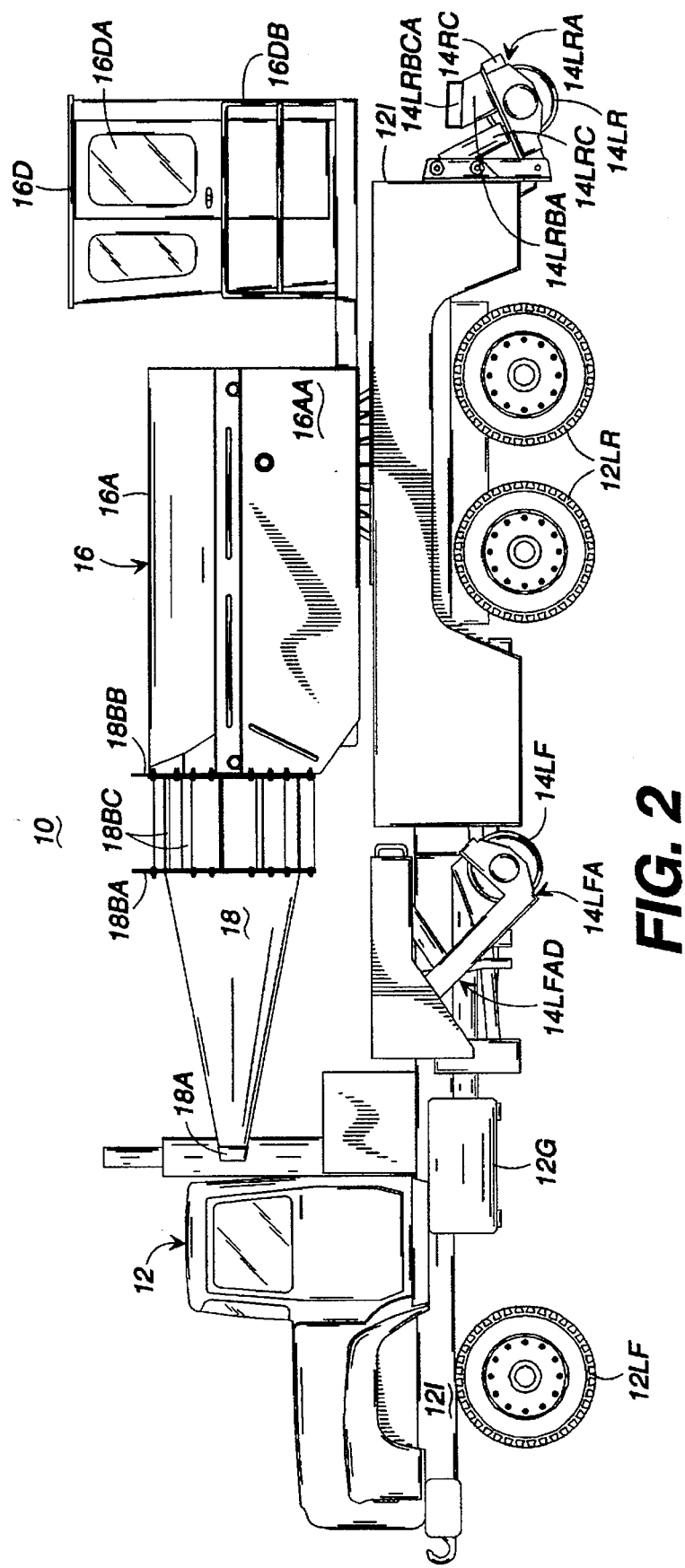
FIG. 2 is a left side view of a snow and ice melting device (10) in a road transporting configuration.
Figure 3:
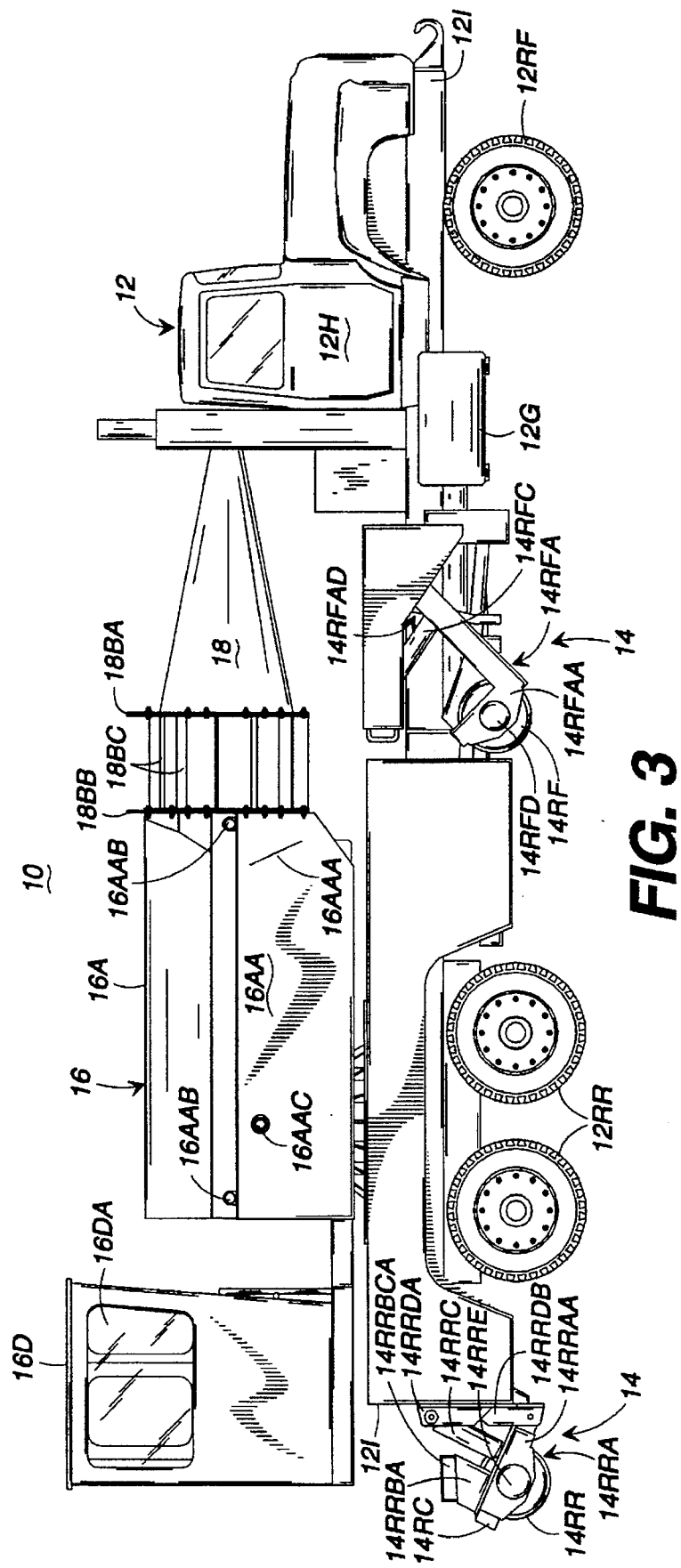
FIG. 3 is a right side view of a snow and ice melting device (10) in a road transporting configuration.
Figure 4:
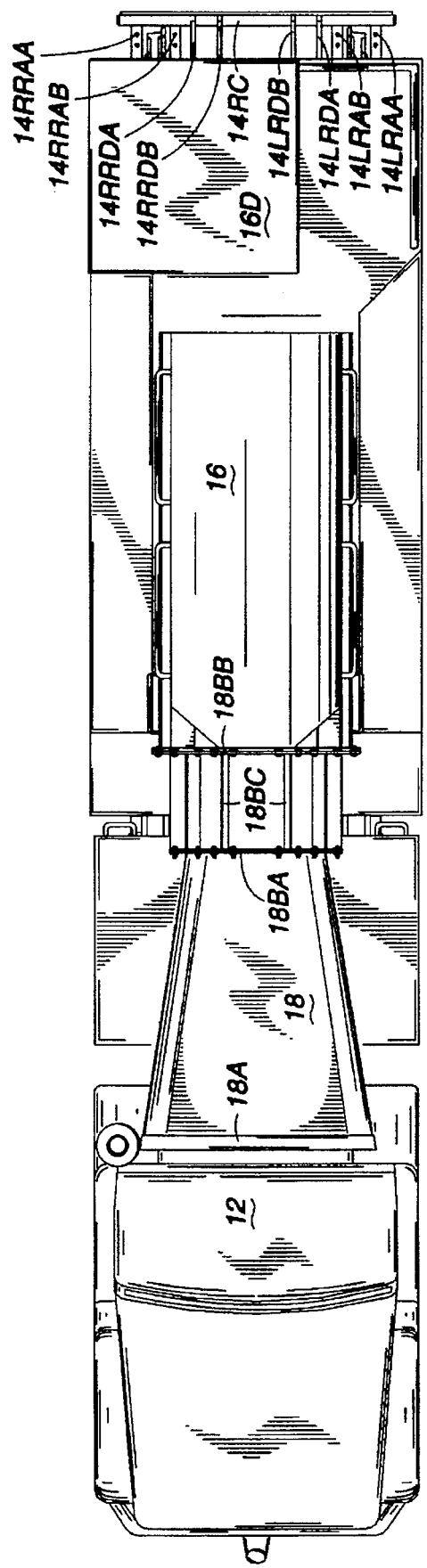
FIG. 4 is a top view of a snow and ice melting device (10).

Referring to FIG. 1, FIG. 2, FIG. 3, and FIG. 4 which are a left-rear perspective view, left side view, right side view, and top view, respectively, of a snow and ice melting device (10) in a road transporting configuration. The snow and ice melting device (10) comprises a road transport vehicle (12) and a railroad track transport vehicle (14) integrally attached to each other. The road transport vehicle (12) comprises a road transport vehicle power means (12A) (not shown), powered by road transport vehicle fuel (12G), which is mechanically attached to a road transport vehicle transmission which is mechanically attached to a road transport vehicle drive shaft. The road transport vehicle drive shaft is mechanically attached to a road transport vehicle axial gear box which in mm mechanically rotates (via axle) a road transport vehicle left from road wheel (12LF) and road transport vehicle right from road wheel (12RF) and/or a road transport vehicle left rear road wheel (12LR) and road transport vehicle right rear road wheel (12RR). The road transport vehicle (12) has a road transport vehicle railroad track converter (12E) which activates a road transport vehicle hydraulic power means (12F) which functions to drive the railroad track transport vehicle (14). The road transport vehicle (12) has a road transport vehicle housing (12H) mounted on a road transport vehicle chassis (12I). Thereby, the road transport vehicle (12) is able to move on a road.

The railroad track transport vehicle (14) has a railroad track transport vehicle hydraulic means (14A) which is powered by the road transport vehicle hydraulic power means (12F). The railroad track transport vehicle hydraulic means (14A) (not shown) is hydraulically coupled to a railroad track transport vehicle hydraulic means up-down converter (14AA) which functions to raise and lower a railroad track transport vehicle left front wheel (14LF), a railroad track transport vehicle right front wheel (14RF), a railroad track transport vehicle left rear wheel (14LR), and a railroad track transport vehicle right rear wheel (14RR). The railroad track transport vehicle hydraulic means (14A) is hydraulically coupled to a railroad track transport vehicle hydraulic means forward-reverse converter (14AB) which functions to rotate the railroad track transport vehicle left front wheel (14LF), the railroad track transport vehicle right front wheel (14RF), the railroad track transport vehicle left rear wheel (14LR), and the railroad track transport vehicle right rear wheel (14RR) in a forward and rearward direction.

The railroad track transport vehicle (14) is integrally mounted on the road transport vehicle chassis (12I), and the railroad track transport vehicle (14) comprises a railroad track transport vehicle hydraulic means clockwise/counterclockwise converter hydraulically coupled to the railroad track transport vehicle hydraulic means.

The railroad track transport vehicle hydraulic means up-down converter (14AA) is hydraulically coupled to a railroad track transport vehicle left front wheel hydraulic piston (14LFC), a railroad track transport vehicle right front wheel hydraulic piston (14RFC), a railroad track transport vehicle left rear wheel hydraulic piston, and a railroad track transport vehicle right rear wheel hydraulic piston (14RRC). The railroad track transport vehicle left front wheel hydraulic piston (14LFC) is mechanically attached to a railroad track transport vehicle left front wheel hydraulic piston plate (14LFCA) which is securely fastened to a railroad track transport vehicle left front wheel stanchion (14LFA) which consists of a railroad track transport vehicle left from wheel outer stanchion (14LFAA) and a railroad track transport vehicle left front wheel inner stanchion (not shown) having a railroad track transport vehicle left from wheel inner-outer stanchion connecting plate (14LFAC) securely fastened therebetween. The railroad track transport vehicle left front wheel stanchion (14LFA) is securely fastened to the railroad track transport vehicle left front wheel stanchion pivot means (14LFAD) which is pivotally connected to the road transport vehicle chassis (12I).

The railroad track transport vehicle hydraulic means forward-reverse converter (14AB) is hydraulically connected to a railroad track transport vehicle left front wheel power means (14LFB) which is mechanically coupled to a railroad track transport vehicle left front wheel axle (14LFD). The railroad track transport vehicle left front wheel power means (14LFB) rotates the railroad track transport vehicle left front wheel axle (14LFD) which is rotatably connected to the railroad track transport vehicle left front wheel outer stanchion (14LFAA) and the railroad track transport vehicle left front wheel inner stanchion (not shown) and securely fastened to the railroad track transport vehicle left front wheel (14LF). The railroad track transport vehicle left front wheel power means (14LFB) functions to rotate the railroad track transport vehicle left front wheel (14LF) in a forward and rearward direction.

The railroad track transport vehicle right front wheel hydraulic piston (14RFC) is mechanically attached to a railroad track transport vehicle right front wheel hydraulic piston plate (not shown) which is securely fastened to a railroad track transport vehicle right front wheel stanchion (14RFA) which consists of a railroad track transport vehicle right from wheel outer stanchion (14RFAA) and a railroad track transport vehicle right front wheel inner stanchion (not shown) having a railroad track transport vehicle right front wheel inner-outer stanchion connecting plate securely fastened therebetween. The railroad track transport vehicle right front wheel stanchion (14RFA) is securely fastened to the railroad track transport vehicle right from wheel stanchion pivot means (14LFAD) (not shown) which is pivotally connected to the road transport vehicle chassis (12I).

The railroad track transport vehicle hydraulic means forward-reverse converter (14AB) is hydraulically connected to a railroad track transport vehicle right front wheel power means (14RFB) which is mechanically coupled to a railroad track transport vehicle right front wheel axle (14RFD). The railroad track transport vehicle right front wheel power means (14RFB) rotates the railroad track transport vehicle right front wheel axle (14RFD) which is rotatably connected to the railroad track transport vehicle right front wheel outer stanchion (14RFAA) and the railroad track transport vehicle right front wheel inner stanchion (not shown) and securely fastened to the railroad track transport vehicle right front wheel (14RF). The railroad track transport vehicle right front wheel power means (14RFB) functions to rotate the railroad track transport vehicle right front wheel (14RF) in a forward and rearward direction.

The railroad track transport vehicle left rear wheel hydraulic piston is mechanically attached to a railroad track transport vehicle left rear wheel hydraulic piston plate (not shown) which is securely fastened to a railroad track transport vehicle left rear wheel stanchion (14LRA) which consists of a railroad transport vehicle left rear wheel outer stanchion (14LRAA) and a railroad track transport vehicle left rear wheel inner stanchion (not shown) having a railroad track transport vehicle left rear wheel inner-outer stanchion connecting plate securely fastened therebetween. The railroad track transport vehicle right from wheel stanchion (14RFA) is securely fastened to the railroad track transport vehicle right from wheel stanchion pivot means (14RFAD) which is pivotally connected to the road transport vehicle chassis (12I).

The railroad track transport vehicle hydraulic means forward-reverse converter (14AB) (not shown) is hydraulically connected to a railroad track transport vehicle fight front wheel power means (14RFB) (not shown) which is mechanically coupled to a railroad track transport vehicle right front wheel axle (14RFD). The railroad track transport vehicle right front wheel power means (14RFB) (not shown) rotates the railroad track transport vehicle right front wheel axle (14RFD) which is rotatably connected to the railroad track transport vehicle right front wheel outer stanchion (14RFAA) and the railroad track transport vehicle right front wheel inner stanchion (not shown) and securely fastened to the railroad track transport vehicle fight front wheel (14RF). The railroad track transport vehicle right front wheel power means (14RFB) functions to rotate the railroad track transport vehicle fight from wheel (14RF) in a forward and rearward direction.

The railroad track transport vehicle hydraulic means forward-reverse converter (14AB) is hydraulically connected to a railroad track transport vehicle left rear wheel power means (14LRB) which is mechanically coupled to a railroad track transport vehicle left rear wheel axle (14LRE). The railroad track transport vehicle left rear wheel power means (14LRB) rotates the railroad track transport vehicle left rear wheel axle (14LRE) which is rotatably connected to the railroad track transport vehicle left rear wheel stanchion (14LRA) consisting of a railroad track transport vehicle left rear wheel outer stanchion (14LRAA) and a railroad track transport vehicle left rear wheel inner stanchion (not shown) and securely fastened to the railroad track transport vehicle left rear wheel (14LR). The railroad track transport vehicle left rear wheel power means (14LRB) functions to rotate the railroad track transport vehicle left rear wheel (14LR) in a forward and rearward direction.

The railroad track transport vehicle left rear wheel hydraulic piston is mechanically attached to a railroad track transport vehicle left rear wheel hydraulic piston plate (14LRCA) which is securely fastened to the railroad track transport vehicle left rear wheel inner stanchion (not shown) and a railroad track transport vehicle right rear wheel hydraulic piston plate (14RRCA). A railroad track transport vehicle left rear wheel inner-outer stanchion connecting plate (14LRAC) securely connects the railroad track transport vehicle left rear wheel outer stanchion (14LRAA) and the railroad track transport vehicle left rear wheel inner stanchion (not shown) together. A railroad track transport vehicle rear wheel stanchion connecting plate (14RC) securely fastens the railroad track transport vehicle left rear wheel stanchion (14LRA) and the railroad track transport vehicle right rear wheel stanchion (14RRA) together. At a top distal end of the railroad track transport vehicle left rear wheel stanchion (14LRA) is a railroad track transport vehicle left rear wheel stanchion pivot means (not shown) which is hingably fastened to a railroad track transport vehicle left rear wheel stanchion connector lower pivot means (14LRDB) which is pivotally connected to a railroad track transport vehicle left rear wheel stanchion connector upper pivot means (14LRDA) which is securely fastened to the road transport vehicle chassis (12I). The railroad track transport vehicle left rear wheel stanchion connector lower pivot means (14LRDB), the railroad track transport vehicle left rear wheel stanchion connector upper pivot means (14LRDA), and the railroad track transport vehicle left rear wheel stanchion (14LRA) function in unison to lower and raise the railroad track transport vehicle left rear wheel (14LR) via the railroad track transport vehicle left rear wheel hydraulic piston.

A railroad track transport vehicle left rear wheel housing is positioned between the railroad track transport vehicle left rear wheel outer stanchion (14LRAA) and the railroad track transport vehicle left rear wheel inner stanchion (not shown). The railroad track transport vehicle left rear wheel housing consists of a railroad track transport vehicle left rear wheel outer housing and a railroad track transport vehicle left rear wheel inner housing (not shown) securely connected therebetween by a railroad track transport vehicle left rear wheel outer-inner housing connecting plate having a railroad track transport vehicle left rear wheel outer-inner housing connecting plate bracket securely mounted thereon.

The railroad track transport vehicle right rear wheel hydraulic piston (14RRC) is mechanically attached to a railroad track transport vehicle right rear wheel hydraulic piston plate (14RRCA) which is securely fastened to the railroad track transport vehicle left rear wheel inner stanchion (14RAB) and a railroad track transport vehicle left rear wheel hydraulic piston plate. A railroad track transport vehicle right rear wheel inner-outer stanchion connecting plate securely connects the railroad track transport vehicle right rear wheel outer stanchion (14RRAA) and the railroad track transport vehicle right rear wheel inner stanchion together. A railroad track transport vehicle rear wheel stanchion connecting plate (14RC) securely fastens the railroad track transport vehicle left rear wheel stanchion (14LRA) and the railroad track transport vehicle right rear wheel stanchion (14RRA) together. At a top distal end of the railroad track transport vehicle right rear wheel stanchion (14RRA) is a railroad track transport vehicle right rear wheel stanchion pivot means which is pivotally fastened to a railroad track transport vehicle right rear wheel stanchion connector lower pivot means (14RRDB) which is pivotally connected to a railroad track transport vehicle right rear wheel stanchion connector upper pivot means (14RRDA) which is securely fastened to the road transport vehicle chassis (12I). The railroad track transport vehicle right rear wheel stanchion connector lower pivot means (14RRDB), the railroad track transport vehicle right rear wheel stanchion connector upper pivot means (14RRDA), and the railroad track transport vehicle right rear wheel stanchion (14RRA) function in unison to lower and raise the railroad track transport vehicle right rear wheel (14RR) via the railroad track transport vehicle right rear wheel hydraulic piston (14RRC).

A railroad track transport vehicle right rear wheel housing (14RRB) is positioned between the railroad track transport vehicle right rear wheel outer stanchion (14RRAA) and the railroad track transport vehicle right rear wheel inner stanchion (14RRAB). The railroad track transport vehicle right rear wheel housing (14RRB) consists of a railroad track transport vehicle right rear wheel outer housing and a railroad track transport vehicle right rear wheel inner housing (14RRBB) securely connected therebetween by a railroad track transport vehicle right rear wheel outer-inner housing connecting plate (14RRBC) having a railroad track transport vehicle right rear wheel outer-inner housing connecting plate bracket (14RRBCA) securely mounted thereon.

The melter (16) is rotatably mounted on the melter rotator (16C) which functions to pivot the melter (16) from a forward facing direction during transportation to a rearward facing direction for use. The melter (16) comprises a melter housing (16A) having a melter housing shroud (16AA). The melter housing shroud (16AA) has melter housing shroud handles (16AAA) which are utilized for manually lifting, lowering and positioning the melter (16) upon failure of the hydraulic system. The melter housing shroud (16AA) is attached to the melter (16) by melter housing shroud fasteners (16AAB). The melter (16) has melter housing shroud ports (16AAC) which function to allow the user to access the melter (16). The melter (16) consists of a melter heat generating means (16B) which is preferably a jet engine of a type which can utilize similar fuel, such as diesel, which is utilized by the road transport vehicle power means (12A). The melter heat generating means (16B) has a melter heat generating means air intake (16BA) which ingresses air to be mixed with fuel prior to combustion. In addition, the melter (16) has a melter operator housing (16D), which preferably consists of at least one melter operator housing window (16DA) and a melter operator housing safety rail (16DB), for protection of a user during operation. At the most distal end of the melter heat generating means (16B) is a nozzle (18).

The nozzle (18) functions to focus and concentrate the heat via a nozzle diffuser (18A) which increases melting efficiency. The nozzle (18) is attached to the melter heat generating means (16B) by a nozzle front connecting bracket (18BA) which is securely fastened on the nozzle (18). The nozzle front connecting bracket (18BA) is connected to a nozzle rear connecting bracket (18BB), which is securely fastened to the melter housing (16A), via a plurality of nozzle connecting bracket fins (18BC).

Figure 5:
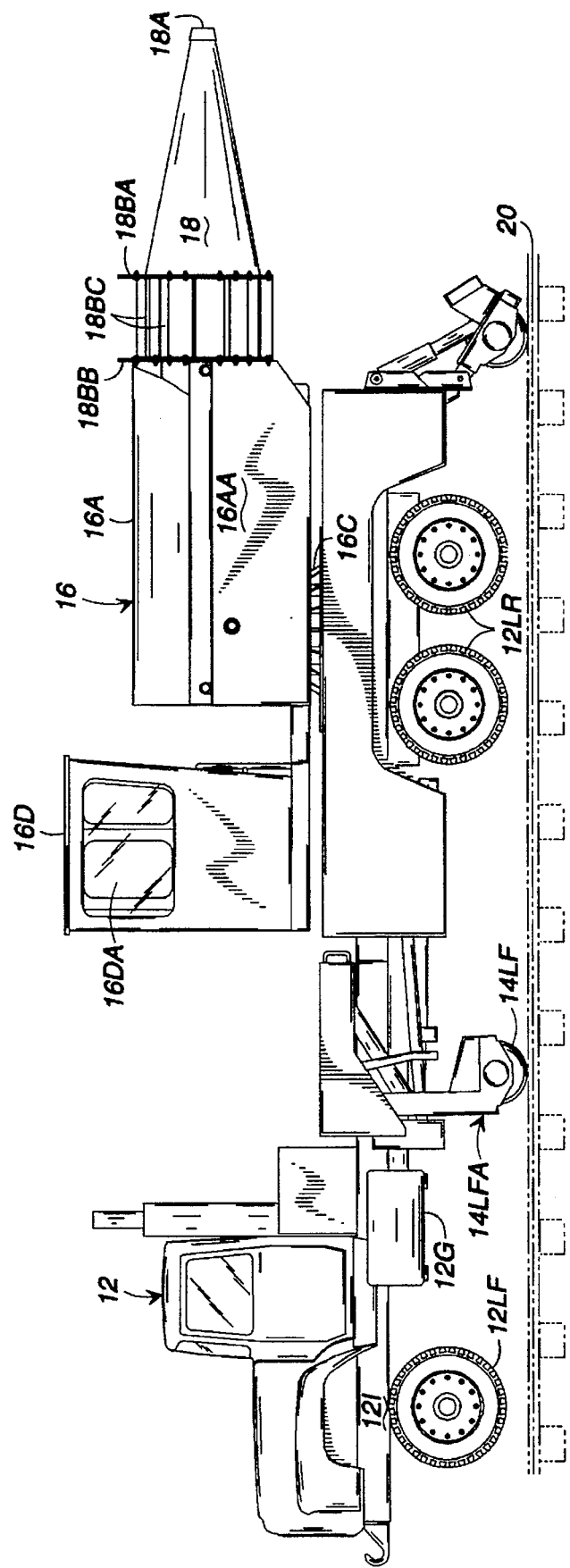
FIG. 5 is a right side view of a snow and ice melting device (10) in a railroad track transporting configuration with a melter (16) in an upward transporting position.
Figure 6:
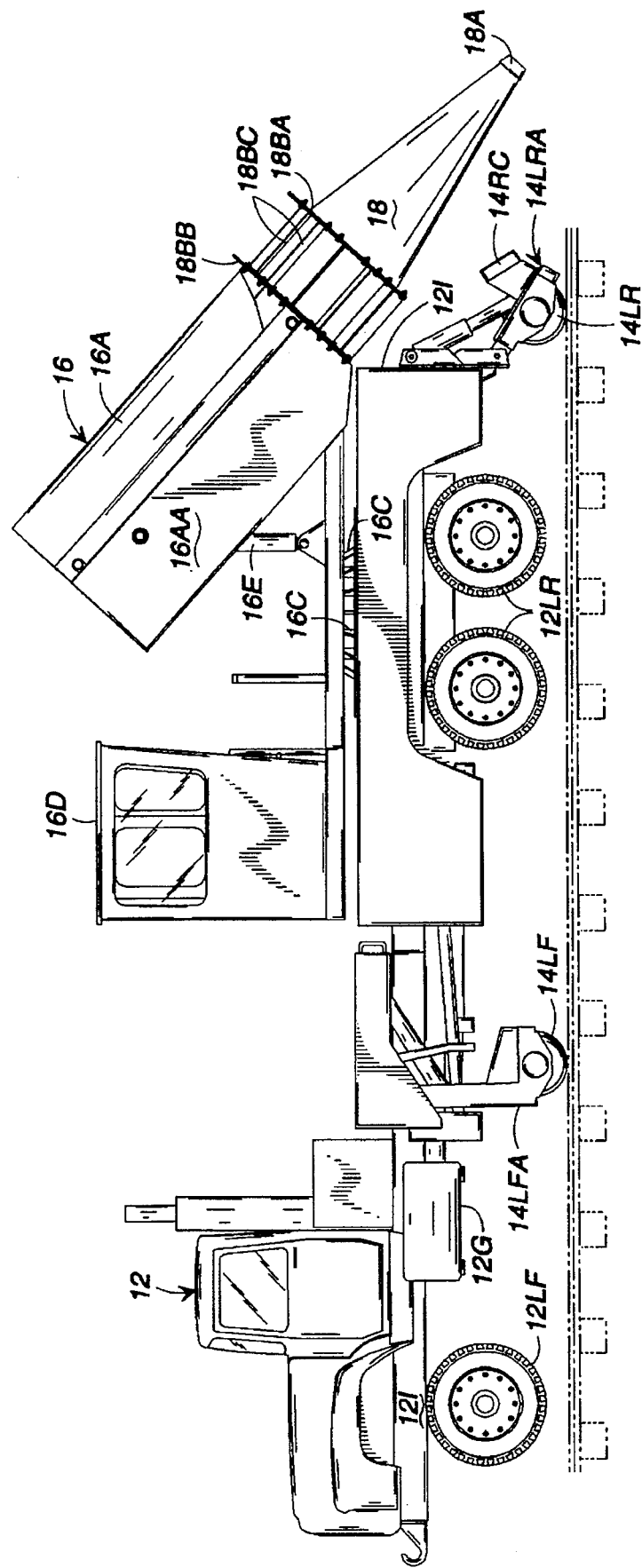
FIG. 6 is a fight side view of a snow and ice melting device (10) in a railroad track transporting configuration with a melter (16) in a downward melting position.
Figure 7:
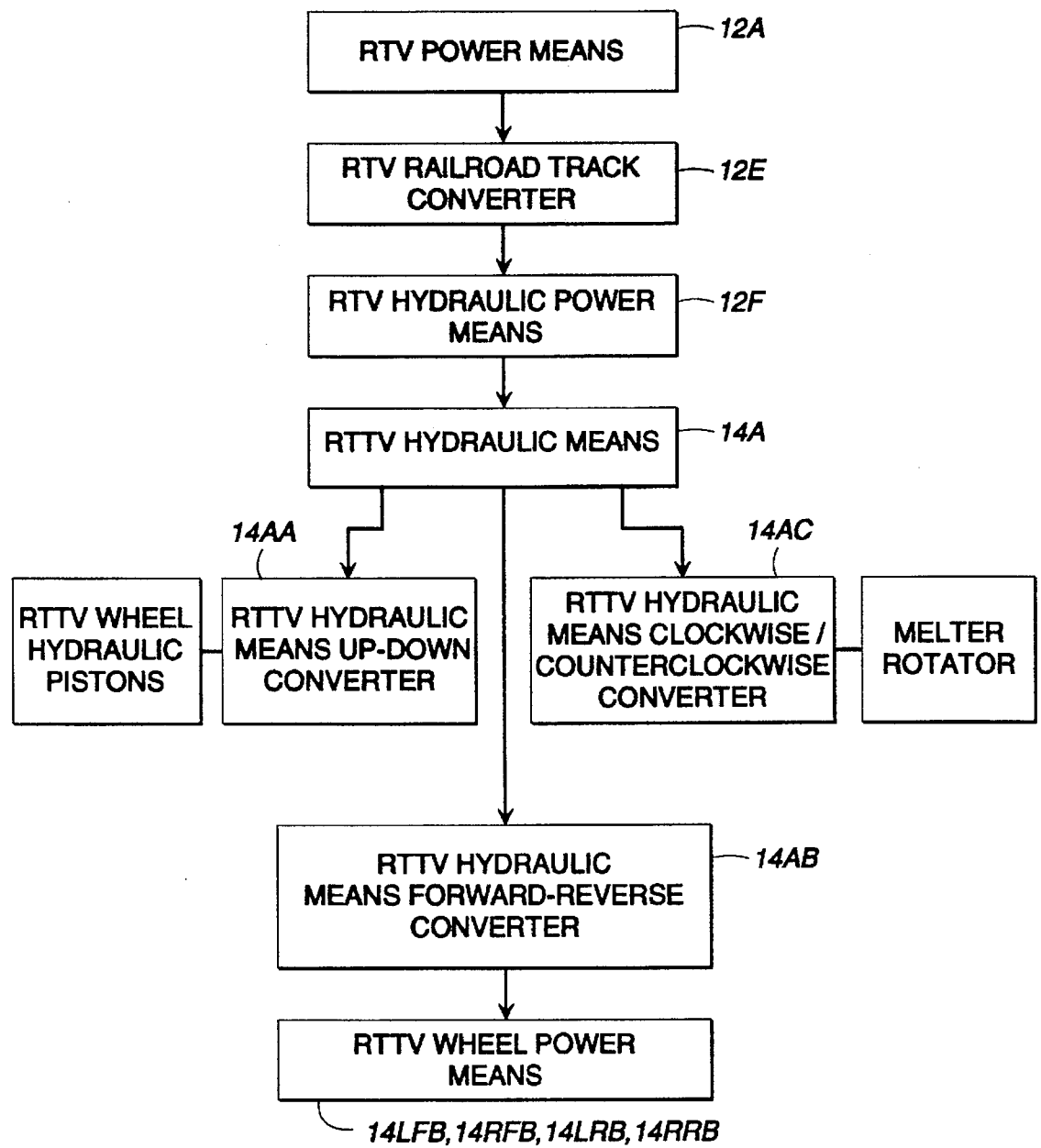
FIG. 7 is a block diagram illustrating the power and hydraulic components of the snow and ice melting device.

Referring to FIG. 5 and FIG. 6 which are a right side view of a snow and ice melting device (10) in a railroad track transporting configuration with a melter (16) in an upward transporting position and downward melting position, respectively. The snow and ice melting device (10) is transported rapidly via roadways to a problem spot in the railroad track which required ice and/or snow removal. The snow and ice melting device (10) via its road transport vehicle (12) is driven and positioned sideways, strattling railroad tracks, at a road crossover. When in the snow and ice melting device (10) is in the proper position, whereby the railroad tracks are directly underneath in a parallel configuration to the road transport vehicle chassis (12I) having all four road transport vehicle road wheels (12LF, 12RF, 12LR, 12RR) exterior to the railroad tracks, the railroad track transport vehicle (14) is engaged by a user. The user first activates the railroad track transport vehicle hydraulic means (14A) which in turn activates the railroad track transport vehicle hydraulic means up-down converter (14AA) which functions to lower the railroad track transport vehicle left front wheel (14LF), the railroad track transport vehicle right font wheel (14RF), the railroad track transport vehicle left rear wheel (14LR), and the railroad track transport vehicle right rear wheel (14RR) via railroad track transport vehicle left front wheel hydraulic piston (14LFC), railroad track transport vehicle right front wheel hydraulic piston (14RFC), railroad track transport vehicle left rear wheel hydraulic piston, and railroad track transport vehicle right rear wheel hydraulic piston (14RRC), respectively. Once the railroad track transport vehicle right front wheels (14LF, 14RF, 14LR, 14RR) engage the railroad track (20), the road transport vehicle (12) is hydraulically raised by the railroad track transport vehicle hydraulic means up-down converter (14AA) until the road transport vehicle road wheels (12LF, 12RF, 12LR, 12RR) are slightly lifted above the railroad track (20). The user then engages the railroad track transport vehicle hydraulic means forward-reverse converter (14AB) functions to rotate the railroad track transport vehicle left from wheel (14LF), the railroad track transport vehicle right front wheel (14RF), the railroad track transport vehicle left rear wheel (14LR), and the railroad track transport vehicle right rear wheel (14RR) in a forward and rearward direction to the problematic place in the railroad track (20) which requires snow and/or ice melting. The user then rotates the melter (16) to face in a rearward direction by activating the melter rotator (16C) and then raises the melter heat generating means (16B) by activating a melter lift (16E), which is movably attached to the melter rotator (16C) the melter rotator (16C) is 360 degrees rotatable functioning to allow the snow and ice melting device (10) to clear, melt ice and snow and the melter housing shroud (16AA), until a desired lifting angle is achieved. The user then activates the melter heat generating means (16B) thereby egressing superheated exhaust from the nozzle diffuser (18A) to melt the snow and/or ice.

After the problematic condition on the railroad track (20) is eliminated the snow and ice melting device (10) is transported to the nearest roadway-railroad track (20) crossway via the railroad track transport vehicle (14) for transportation to a new location by the road transport vehicle (12).

It will be understood that each of the elements described above, or two or more together, may also find a useful application in other types of constructions differing from the type described above.

While the invention has been illustrated and described as embodied in a snow and ice melting device, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A snow and ice melting device (10) which is transportable on a roadway and a railroad track (20), the snow and ice melting device (10) comprising:

A) a road transport vehicle (12) having a road transport vehicle housing (12H) mounted on a road transport vehicle chassis (12I) containing a fuel tank therein, the road transport vehicle (12) comprises:

1) a road transport vehicle power means (12A) operatively connected to at least one road transport road wheel, and 2) a road transport vehicle railroad track converter (12E) is hydraulically coupled to a road transport vehicle hydraulic power means (12F) which is hydraulically coupled to a railroad track transport vehicle hydraulic means (14A), B) a railroad track transport vehicle (14) integrally mounted on the road transport vehicle chassis (12I), the railroad track transport vehicle (14) comprises:

1) a railroad track transport vehicle hydraulic means up-down converter (14AA) which is hydraulically coupled to the railroad track transport vehicle hydraulic means (14A), the railroad track transport vehicle hydraulic means up-down converter (14AA) is hydraulically connected to a railroad track transport vehicle left front wheel hydraulic piston (14LFC), a railroad track transport vehicle right front wheel hydraulic piston (14RFC), a railroad track transport vehicle left rear wheel hydraulic piston, and a railroad track transport vehicle right rear wheel hydraulic piston (14RRC), the railroad track transport vehicle left front wheel hydraulic piston (14LFC) is securely attached to a railroad track transport vehicle left front wheel hydraulic piston plate (14LFCA), the railroad track transport vehicle right front wheel hydraulic piston (14RFC) is securely attached to a railroad track transport vehicle right front wheel hydraulic piston plate, the railroad track transport vehicle left rear wheel hydraulic piston (14LRC) is securely attached to a railroad track transport vehicle left rear wheel hydraulic piston plate (14LRCA), the railroad track transport vehicle right rear wheel hydraulic piston (14RRC) is securely attached to a railroad track transport vehicle right rear wheel hydraulic piston plate (14RRCA), 2) a railroad track transport vehicle hydraulic means forward-reverse converter (14AB) which is hydraulically coupled to the railroad track transport vehicle hydraulic means (14A), the railroad track transport vehicle hydraulic means forward-reverse converter (14AB) is hydraulically coupled to at least one railroad track transport vehicle wheel power means which is selected from a group consisting of railroad track transport vehicle left front wheel power means (14LFB) mechanically coupled to a railroad track transport vehicle left front wheel (14LF), railroad track transport vehicle right front wheel power means (14RFB) mechanically coupled to a railroad track transport vehicle right front wheel (14RF), railroad track transport vehicle left rear wheel power means mechanically coupled to a railroad track transport vehicle left rear wheel (14LR), and railroad track transport vehicle right rear wheel power means (14RRB) mechanically coupled to a railroad track transport vehicle right rear wheel (14RR), the railroad track transport vehicle left front wheel (14LF) is rotatably mounted via a railroad track transport vehicle left front wheel axle (14LFD) on a railroad track transport vehicle left front wheel stanchion (14LFA) which is pivotally mounted via a railroad track transport vehicle left front wheel stanchion pivot means (14LFAD) on the road transport vehicle chassis (12I), the railroad track transport vehicle right front wheel (14RF) is rotatably mounted by a railroad track transport vehicle right front wheel axle (14RFD) on a railroad track transport vehicle right front wheel stanchion (14RFA) which is pivotally mounted by a railroad track transport vehicle right front wheel stanchion pivot means (14RFAD) on the road transport vehicle chassis (12I), the railroad track transport vehicle left rear wheel (14LR) is rotatably mounted via a railroad track transport vehicle left rear wheel axle (14LRE) on a railroad track transport vehicle left rear wheel stanchion (14LRA) which is pivotally mounted on the road transport vehicle chassis (12I), the railroad track transport vehicle right rear wheel (14RR) is rotatably mounted by a railroad track transport vehicle right rear wheel axle (14RRE) on a railroad track transport vehicle right rear wheel stanchion (14RRA) which is pivotally mounted on the road transport vehicle chassis (12I), and 3) a railroad track transport vehicle hydraulic means clockwise/counterclockwise converter is hydraulically coupled to the railroad track transport vehicle hydraulic means; and C) a melter (16) movably mounted on the railroad track transport vehicle (14), the melter (16) comprises:

1) a melter housing (16A) within which a melter heat generating means (16B) having a melter heat generating means air intake (16BA) is securely positioned, 2) a melter rotator (16C) is mounted on the road transport vehicle chassis (12I) and hydraulically coupled to the railroad track transport vehicle hydraulic means clockwise/counterclockwise converter, and 3) a melter lift mounted on the meter rotator and hydraulically coupled to the railroad track transport vehicle hydraulic means.

2. The snow and ice melting device (10) as described in claim 1, wherein the railroad track transport vehicle left front wheel stanchion (14LFA) comprises a railroad track transport vehicle left front wheel outer stanchion (14LFAA) securely fastened to a railroad track transport vehicle left front wheel inner stanchion by a railroad track transport vehicle left front wheel inner-outer stanchion connecting plate (14LFAC).

3. The snow and ice melting device (10) as described in claim 1, wherein the railroad track transport vehicle right front wheel stanchion (14RFA) comprises a railroad track transport vehicle right front wheel outer stanchion (14RFAA) securely fastened to a railroad track transport vehicle right front wheel inner stanchion by a railroad track transport vehicle right front wheel inner-outer stanchion connecting plate.

4. The snow and ice melting device (10) as described in claim 1, wherein the railroad track transport vehicle left rear wheel stanchion (14LRA) comprises a railroad track transport vehicle left rear wheel outer stanchion (14LRAA) securely fastened to a railroad track transport vehicle left rear wheel inner stanchion by a railroad track transport vehicle left rear wheel inner-outer stanchion connecting plate.

5. The snow and ice melting device (10) as described in claim 1, wherein the railroad track transport vehicle right rear wheel stanchion (14RRA) comprises a railroad track transport vehicle right rear wheel outer stanchion (14RRAA) securely fastened to a railroad track transport vehicle right rear wheel inner stanchion (14RRAB) by a railroad track transport vehicle right rear wheel inner-outer stanchion connecting plate.

6. The snow and ice melting device (10) as described in claim 1, wherein the railroad track transport vehicle left rear wheel stanchion pivot means (14LRAE) comprises a railroad track transport vehicle left rear wheel stanchion connector lower pivot means (14LRDB) pivotally connected to a railroad track transport vehicle left rear wheel stanchion connector upper pivot means (14LRDA) which is securely mounted on the road transport vehicle chassis (12I).

7. The snow and ice melting device (10) as described in claim 1, wherein the railroad track transport vehicle left rear wheel (14LR) is contained within a railroad track transport vehicle left rear wheel housing.

8. The snow and ice melting device (10) as described in claim 7, wherein the railroad track transport vehicle left rear wheel housing is securely fastened within the railroad track transport vehicle left rear wheel stanchion (14LRA).

9. The snow and ice melting device (10) as described in claim 7, wherein the railroad track transport vehicle left rear wheel housing comprises a railroad track transport vehicle left rear wheel outer housing (14LRBA) securely fastened to a railroad track transport vehicle left rear wheel inner housing (14LRBB) by a railroad track transport vehicle left rear wheel outer-inner housing connecting plate.

10. The snow and ice melting device (10) as described in claim 9, wherein the railroad track transport vehicle left rear wheel outer-inner housing connecting plate has a railroad track transport vehicle left rear wheel outer-inner housing connecting plate bracket (14LRBCA) mounted thereon.

11. The snow and ice melting device (10) as described in claim 1, wherein the railroad track transport vehicle right rear wheel stanchion pivot means (14RRAE) comprises a railroad track transport vehicle right rear wheel stanchion connector lower pivot means (14RRDB) pivotally connected to a railroad track transport vehicle right rear wheel stanchion connector upper pivot means (14RRDA) which is securely mounted on the road transport vehicle chassis (12I).

12. The snow and ice melting device (10) as described in claim 1, wherein the railroad track transport vehicle right rear wheel (14RR) is contained within a railroad track transport vehicle right rear wheel housing (14RRB).

13. The snow and ice melting device (10) as described in claim 12, wherein the railroad track transport vehicle right rear wheel housing (14RRB) is securely fastened within the railroad track transport vehicle right rear wheel stanchion (14RRA).

14. The snow and ice melting device (10) as described in claim 12, wherein the railroad track transport vehicle right rear wheel housing (14RRB) comprises a railroad track transport vehicle right rear wheel outer housing securely fastened to a railroad track transport vehicle right rear wheel inner housing (14RRBB) by a railroad track transport vehicle right rear wheel outer-inner housing connecting plate (14RRBC).

15. The snow and ice melting device (10) as described in claim 14, wherein the railroad track transport vehicle right rear wheel outer-inner housing connecting plate (14RRBC) has a railroad track transport vehicle right rear wheel outer-inner housing connecting plate bracket (14RRBCA) mounted thereon.

16. The snow and ice melting device (10) as described in claim 1, wherein the melter housing (16A) has a melter housing shroud (16AA) attached thereto by at least one melter housing shroud fastener (16AAB).

17. The snow and ice melting device (10) as described in claim 16, wherein the melter housing shroud (16AA) has at least one melter housing shroud handle (16AAA) attached thereto.

18. The snow and ice melting device (10) as described in claim 16, wherein the melter housing shroud (16AA) has at least one melter housing shroud port (16AAC) functioning to allow access to the melter heat generating means (16B).

19. The snow and ice melting device (10) as described in claim 1, wherein the melter (16) has a melter operator housing (16D) attached thereto.

20. The snow and ice melting device (10) as described in claim 19, wherein the melter operator housing (16D) has at least one melter operator housing window (16DA).

21. The snow and ice melting device (10) as described in claim 19, wherein the melter operator housing (16D) has at least one melter operator housing safety rail (16DB).

22. The snow and ice melting device (10) as described in claim 1, wherein the melter has a nozzle (18) connected thereto.

23. The snow and ice melting device (10) as described in claim 22, wherein the nozzle (18) has a nozzle diffuser (18A).

24. The snow and ice melting device (10) as described in claim 22, wherein the nozzle (18) is connected to the melter (16) by a connecting bracket means comprising a nozzle front connecting bracket (18BA) which is securely attached to the nozzle (18) and a nozzle rear connecting bracket (18BB) which is securely fastened to the melter (16), the nozzle front connecting bracket (18BA) is securely fastened to the nozzle rear connecting bracket (18BB) by a plurality of nozzle connecting bracket fins (18BC).

25. The snow and ice melting device (10) as described in claim 1, wherein the melter rotator (16C) is 360 degrees rotatable functioning to allow the snow and ice melting device (10) to clear, melt ice and snow.

* * * * *